No. 615,284.  
Patented Dec. 6, 1898.

H. G. KOUNTZ.
LEVELER ATTACHMENT FOR CULTIVATORS.
(Application filed Jan. 10, 1898.)

(No Model.)

Witnesses.  
John L. Adair  
Robert L. Adair

Inventor.  
Harry G. Kountz  
pr. H. B. Swartz Atty.

UNITED STATES PATENT OFFICE.

HARRY G. KOUNTZ, OF WOOSTER, OHIO.

LEVELER ATTACHMENT FOR CULTIVATORS.

SPECIFICATION forming part of Letters Patent No. 615,284, dated December 6, 1898.

Application filed January 10, 1898. Serial No. 666,260. (No model.)

*To all whom it may concern:*

Be it known that I, HARRY G. KOUNTZ, a citizen of the United States, residing at Wooster, in the county of Wayne and State of Ohio, have invented a new and useful Leveler Attachment for Cultivators, of which the following is a specification.

My invention relates to attachments for cultivators.

It consists of an adjustable leveler or float attachment adapted to follow the cultivator-teeth to level the soil by its own gravity and adjustment independently of the vertical action of the cultivator-teeth.

My invention is illustrated by the accompanying drawings, in which similar letters and numerals of reference indicate like parts.

Figure 1:
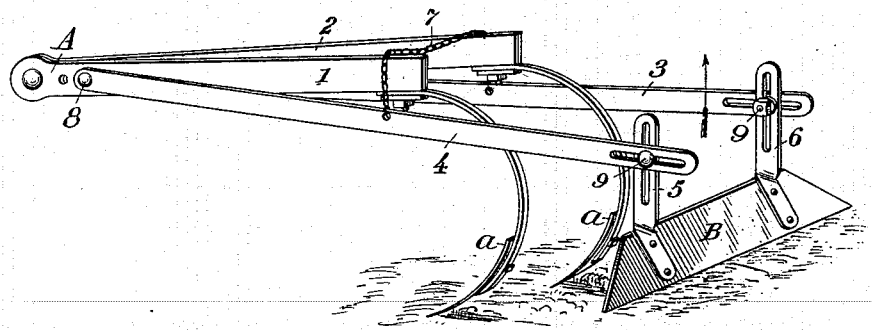
Figure 2:
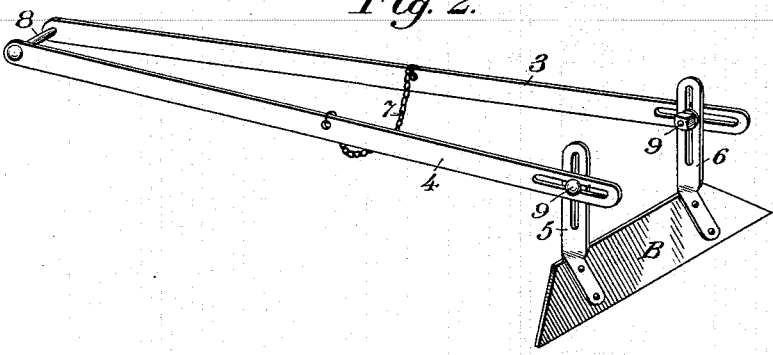

Referring to the drawings, Figure 1 is a detached view of ordinary cultivator beams and teeth with my leveler attachment in position for work. Fig. 2 is a view of my invention detached from the cultivator.

In the drawings, A is the cultivator-beam head, having beams 1 2, with cultivator-teeth *a a* attached and operating in the usual and well-known way.

B is my leveler attachment, made of any suitable material.

3 4 are drag-bars preferably attached to the head of the cultivator-beams by a loose pivot-bolt 8, so as to permit freedom of action to the outer ends of the drag-bars, which are slotted to connect adjustably with slotted bars 5 6, attached to the leveler or float at its opposite ends to admit of any desired vertical, horizontal, or angular adjustment of the leveler to the soil. The drag-bars are loosely connected with the beam by means of a chain 7 or other suitable means to make the lifting of the teeth out of the soil lift also the leveler with them and at the same time admit of the operation of the teeth in the soil independently of any contact with the leveler, so as to avoid any obstruction.

Heretofore levelers for similar purposes have been used by attaching the same in solid connection with the beams or the teeth of the cultivator. Such devices prevent the independent action of the teeth by the weight and contact of the leveler, defects which my improvement will avoid. Moreover, such free action as I secure prevents any obstruction that may pass under the float from in any way affecting the action of the teeth, and vice versa, and the weight of the leveler and its connections do not add any pressure to the teeth in the soil, and my invention may be readily attached to any ordinary cultivator without special adaptation. My improvement consists especially in the novel method of attachment and operation described, whereby the leveler blade or float acts vertically upon the soil by its own gravity entirely independent of the vertical action of the cultivator-gangs by means of the leveler-blade being adjustably secured to the outer ends of the drag-bars, while their inner ends are hinged to the cultivator to give free vertical action to said outer ends and leveler instead of being limited in their vertical sweep more or less by connection with the gangs to move up and down with the same, as heretofore.

Having thus fully described my invention, what I claim as new, and desire to secure by Letters Patent, is—

1. In a cultivator, the combination with the teeth or gangs thereof, of an adjustable leveler or float attached to the cultivator by means of drag-bars pivoted to the cultivator-frame at their forward ends, and at their rearward ends adjustably engaging the standards of the leveler; said leveler adapted by means aforesaid to oscillate vertically on said pivot connection independent of the gangs, substantially as set forth and for the purpose specified.

2. In a cultivator, the combination with the teeth or gangs thereof, of drag-bars whose forward ends are secured to the cultivator by pivot connection to permit free vertical action of the rearward ends thereof to which the leveler is adjustably attached by means adapting the same to vertical, horizontal, or other angular adjustment, substantially as and for the purpose specified.

3. In a cultivator, the combination with the cultivator-beams, of drag-bars, having a pivoted connection with the cultivator at their forward ends and rearward ends free to act vertically on said pivot, independently of the action of the gangs, a leveler adjustably secured to said rearward ends, and a draw or lift chain to loosely connect said beams and drag-bars substantially as and for the purpose specified.

In witness whereof I hereunto set my hand, at Wooster, Ohio, this 1st day of December, A. D. 1897.

HARRY G. KOUNTZ.

Witnesses:
　HIRAM B. SWARTZ,
　A. S. McCLURE.